United States Patent [19]

Nagaoka

[11] Patent Number: 4,648,700
[45] Date of Patent: Mar. 10, 1987

[54] DISTANCE DETECTING DEVICE FOR A CAMERA

[75] Inventor: Shinji Nagaoka, Yotsukaido, Japan

[73] Assignee: Seiko Koki Kabushiki Kaisha, Chiba, Japan

[21] Appl. No.: 738,093

[22] Filed: May 24, 1985

[30] Foreign Application Priority Data

May 25, 1984 [JP] Japan .................. 59-106206

[51] Int. Cl.⁴ .............................................. G03B 3/00
[52] U.S. Cl. ...................................................... 354/403
[58] Field of Search ......................................... 354/403

[56] References Cited

U.S. PATENT DOCUMENTS

| | | | |
|---|---|---|---|
| 3,906,389 | 9/1975 | Matsumoto et al. | 354/403 |
| 3,999,192 | 12/1976 | Hosoe et al. | 354/403 |
| 4,350,418 | 9/1982 | Taguchi et al. | 354/403 |

*Primary Examiner*—Russell E. Adams
*Attorney, Agent, or Firm*—Robert E. Burns; Emmanuel J. Lobato; Bruce L. Adams

[57] ABSTRACT

An active type distance detecting device wherein either a light emitting element or a light receiving element is operated to scan by a scanning means. A signal for driving the scanning means is interposed between pulse signals for causing the light emitting element to emit flickering light so that the former signal may not overlap with the latter pulse signals in order to reduce fluctuations of a load electric current.

1 Claim, 4 Drawing Figures

DISTANCE DETECTING DEVICE FOR A CAMERA

BACKGROUND OF THE INVENTION

This invention relates to a distance detecting device for a camera, and more particularly to a drive signal generating circuit for an active type distance detecting device.

As cameras have been automated, it has been more popular to incorporate a distance measuring device into a camera body.

Distance measuring device incorporated in cameras are commonly classified into two groups including a passive type wherein a focused point of time is detected based on detection of coincidence of double images or dimming and an active type wherein light is irradiated from a light emitting element onto an object and a focussed point of time is detected depending upon a change of reflected light from the object. The latter active type is advantageous for a distance detecting device for a camera in that it is simple in construction and besides it can effect measurement of a distance independently of brightness of the object.

However, the active type requires driving of a light emitting element in synchronized relationship with scanning of a distance measuring optical system. Accordingly, the active type has drawbacks that since drive currents for the distance measuring optical system and the light emitting element overlap each other, a large load electric current becomes necessary, resulting in acceleration of consumption of a cell, and besides high noises are produced due to a rapid change.

SUMMARY OF THE INVENTION

The present invention has been made in view of the above, and it is an object of the invention to provide a distance detecting device for a camera wherein scanning of a distance measuring optical system and driving of a light emitting element are effected alternately thereby to make a load electric current from a cell as low and smooth as possible.

Figure 1:
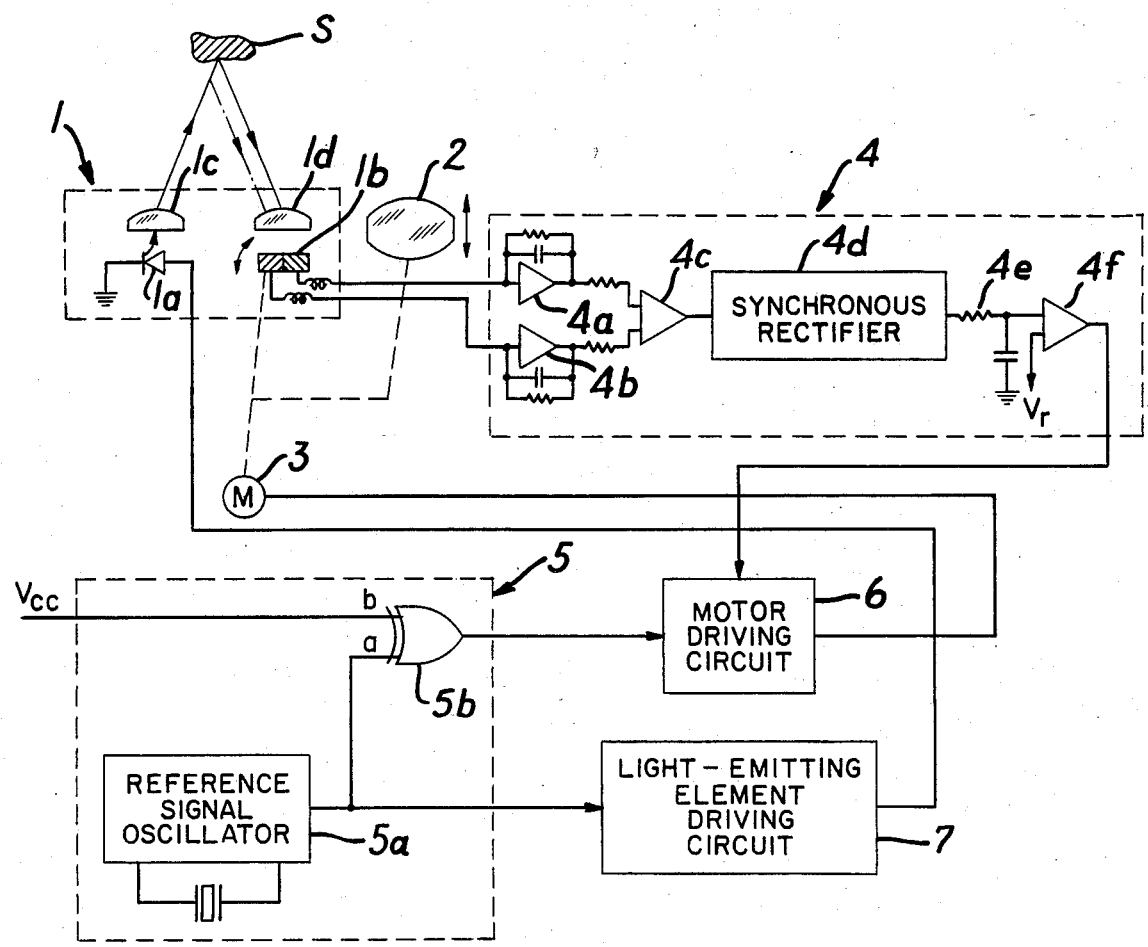
FIG. 1 is a block diagram of a distance detecting device for a camera of an embodiment of the present invention.

1 ... distance measuring optical system
2 ... motor
4 ... distance measuring signal detecting circuit
5 ... distance measuring optical system driving signal generating circuit
5a ... first pulse generating circuit
5b, 5e ... second pulse generating circuit

DETAILED DESCRIPTION

The present invention will now be described in detail in connection with embodiments thereof which are illustrated in the drawings.

Referring to FIG. 1 which is a block diagram of a distance detecting device for a camera of an embodiment of the present invention, reference numeral 1 designates a distance measuring optical system which includes a light emitting element 1a for receiving supply of an electric power from a light emitting element driving circuit which will be hereinafter described to intermittently irradiate a light beam to an object, a pair of light receiving elements 1b connected in antiseries relationship to each other and connected to be driven to scan in a direction of an optical axis of the light emitting element 1a by a motor 3 for moving a taking lens 2 in and out, and a pair of condenser lenses 1c and 1d for condensing irradiated light and reflected light, respectively. Reference numeral 4 denotes a distance measurement detecting circuit which is constructed such that signals from the light receiving elements 1b of the distance measuring optical system 1 are amplified to a predetermined level by a pair of preamplifiers 4a and 4b and a difference between the amplified signals is detected by a differential amplifier 4c and is passed through a synchronous rectifier 4d for detecting in synchronism with flickering of the light emitting element 1a whereafter it is integrated by an R-C integrator circuit 4e and is compared with a reference signal by a comparator 4f so that a signal is outputted when a focused condition is reached. Reference numeral 5 designates a driving signal generating circuit forming a characterized part of the present invention which outputs a signal for driving the distance measuring optical system. The driving signal generating circuit includes a reference signal oscillator 5a forming a first pulse generating circuit for outputting clock signals of a predetermined fixed frequency, and an exclusive OR gate 5b forming a second pulse generating circuit for receiving the clock signals and a high level signal Vcc. Signals from the reference signal oscillator 5a are coupled to a light emitting element driving circuit 7 and the synchronous detector 4d of the distance measuring signal detecting circuit 4 while signals from the exclusive OR gate 5b are coupled to a motor driving circuit 6. Reference numeral 6 denotes the aforementioned motor driving circuit which is constructed such that a signal from the driving signal generating circuit is power amplified to a predetermined level and is supplied to the motor 3 while it interrupts supply of a driving power to stop the motor 3 in response to a focused signal from the distance measuring signal detecting circuit 4. Reference numeral 7 denotes a light emitting element driving circuit for power amplifying a signal from the driving signal generating circuit 5 to operate the light emitting element 1a.

Figure 2:
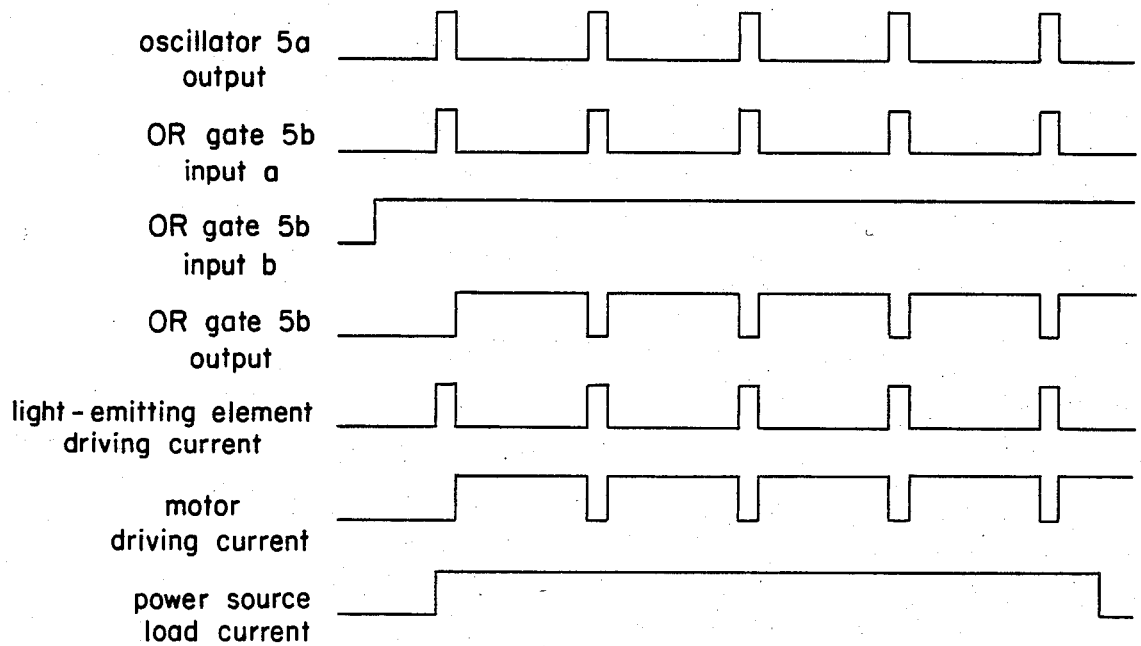
FIG. 2 is a waveform diagram illustrating operations of the device of FIG. 1.

Now, operations of the arrangement having such a construction as described above will be described in connection with a waveform diagram shown in FIG. 2.

If a release button not shown is depressed to supply power to the device, then the reference signal oscillator 5a of the driving signal generating circuit 5 operates to output clock pulses while a high level signal Vcc is supplied to an input terminal of the exclusive OR gate 5b. As the clock pulses are outputted from the reference signal oscillator 5a, the light emitting element 1a irradiates an infrared-ray beam to an object S. As a result, the light receiving elements 1b detect light reflected from the object S and thus the distance measuring signal detecting circuit 4 detects only such signals that coincide with light emitting timings. Since the output of the exclusive OR gate 5b is naturally of a low level when a clock pulse presents a high level, the motor driving circuit 6 is held in an inoperative condition. If a clock pulse is switched into a low level, a high level signal is outputted from the exclusive OR gate 5b so that the motor 3 is rotated to move the light receiving element 1b of the distance measuring optical system 1 and the taking lens 2 in one direction. Since at this point of time the output of the reference signal oscillator 5a is of the low level, the light emitting element 1a is in an extinguished conditions. If a next clock signal is outputted in this manner, the light emitting element 1a is lit again while at the same time the motor 3 is deenergized.

After then, such a sequence of steps will be repeated to move the taking lens 2 and the light receiving elements 1b in the one direction until a signal is outputted from the distance measuring signal detecting circuit to stop operation of the motor driving circuit 6 when the taking lens 2 is focused to the object S.

Figure 3:
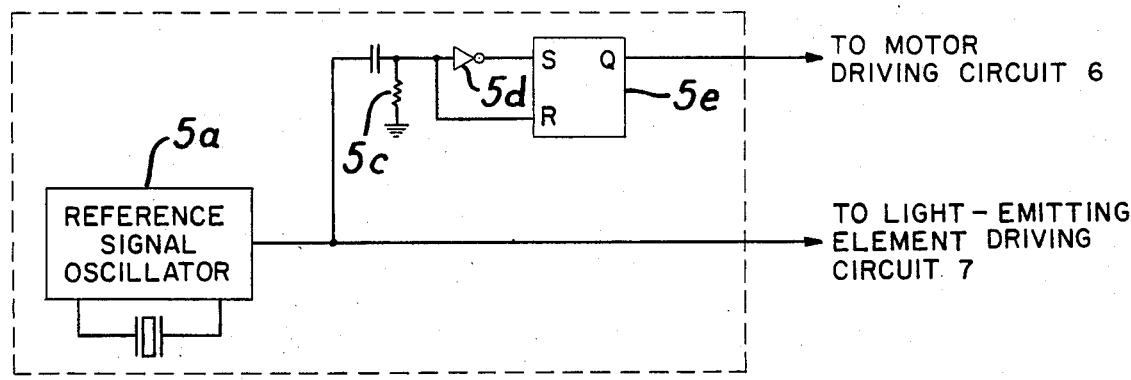
FIGS. 3 and 4 are a block diagram of a distance detecting device for a camera of another embodiment of the invention and a waveform diagram illustrating operations of the device of FIG. 3, respectively.
Figure 4:
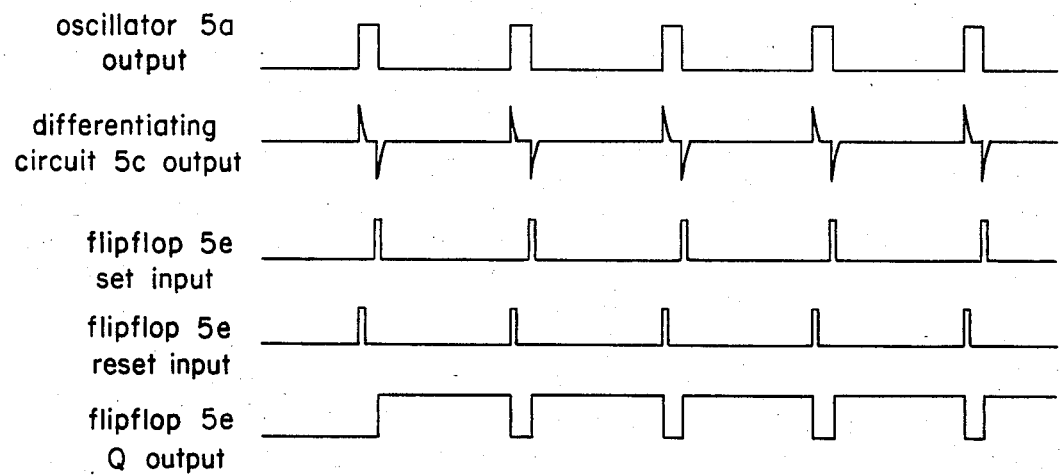

Referring to FIG. 3 which illustrates a second embodiment of the present invention, it includes a reference signal oscillator 5a forming a first pulse generating circuit, and a flipflop 5e forming second pulse generating circuit. The flipflop 5e has a reset terminal at which it receives a signal from the reference signal oscillator 5a which is differentiated by a differentiating circuit 5c, and a set terminal at which it receives a signal which has passed an inverter 5d. As seen from FIG. 4, the flipflop 5e is reset by a rising edge of a clock signal to interrupt energization of the motor 3 and to energize the light emitting element 1a, and it is set by a falling edge to energize the motor 3 and to simultaneously deenergize the light emitting element 1a.

It is to be noted that while in the embodiment described above the light emitting element 1b is energized in response to a signal from the reference signal oscillator 5a, similar operations may be attained if it is energized in response to a reference signal for energizing the motor. Further, while in the embodiment description has been given of an example wherein a light receiving element is moved to scan by a motor, a light emitting element may be moved to scan instead, and also it is naturally possible to apply the present invention to a distance measuring device wherein a solenoid instead of a motor scans a light receiving or light emitting element.

As apparent from the foregoing description, according to the present invention, either a light emitting element or a scanning mechanism is driven upon marking of a reference clock which forms a timing for driving the light emitting element, and either the scanning mechanism or the light emitting element is driven upon spacing of a reference clock. Accordingly, a load current of a distance measuring device upon operation can be reduced low and hence energy of a cell can be utilized effectively. Besides, a load current from a cell becomes smooth and hence production of high frequency noises can be prevented.

What is claimed is:

1. A distance detecting device for a camera of the type wherein a light emitting element and a light receiving element are relatively scanned by a scanning means, characterized in that it comprises a first pulse generating means for outputting clock signals of a predetermined fixed frequency to drive said light emitting element to flicker, and a second pulse generating means for outputting pulse signals of a width corresponding to a space between said clock signals to drive said scanning means.

* * * * *